United States Patent

[11] 3,618,961

| [72] | Inventors | Jozef Kiwalle<br>Peoria, Ill.;<br>Frederick M. Lamb, South Bend, Ind. |
|---|---|---|
| [21] | Appl. No. | 883,959 |
| [22] | Filed | Dec. 10, 1969 |
| [45] | Patented | Nov. 9, 1971 |
| [73] | Assignee | Caterpillar Tractor Co.<br>Peoria, Ill. |

[54] CAM JAW CHUCK
5 Claims, 3 Drawing Figs.

[52] U.S. Cl. ..................................... 279/33,
279/106
[51] Int. Cl. ..................................... B23b 31/12
[50] Field of Search ........................................... 279/106, 1
T, 33, 34; 228/2

[56] References Cited
UNITED STATES PATENTS

| 1,193,141 | 1916 | Hariness ..................... | 279/106 UX |
| 1,412,170 | 1922 | Dixon ........................... | 279/1 T |

*Primary Examiner*—Andrew R. Juhasz
*Assistant Examiner*—James F. Coan
*Attorney*—Fryer, Tjensvold, Feix, Phillips & Lempio ABSTRACT: A chuck assembly for securing a workpiece and having a chuck body rotatably supporting cam-shaped jaw means. The cam-shaped jaw means may be rotated for variable engagement with the workpiece by linear movement of a drawbar member to secure the workpiece between the jaw means and one or more stops arranged upon the chuck body.

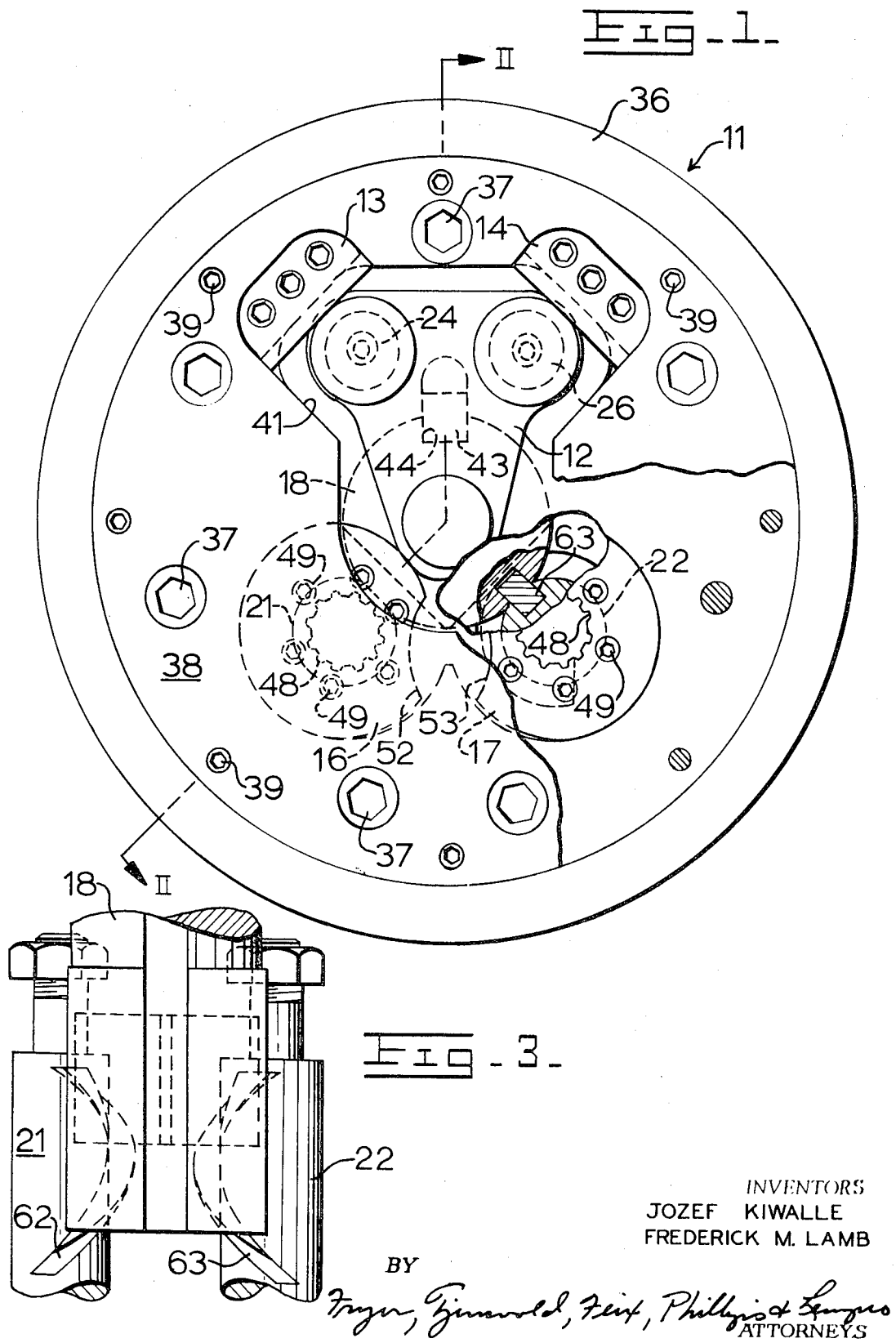

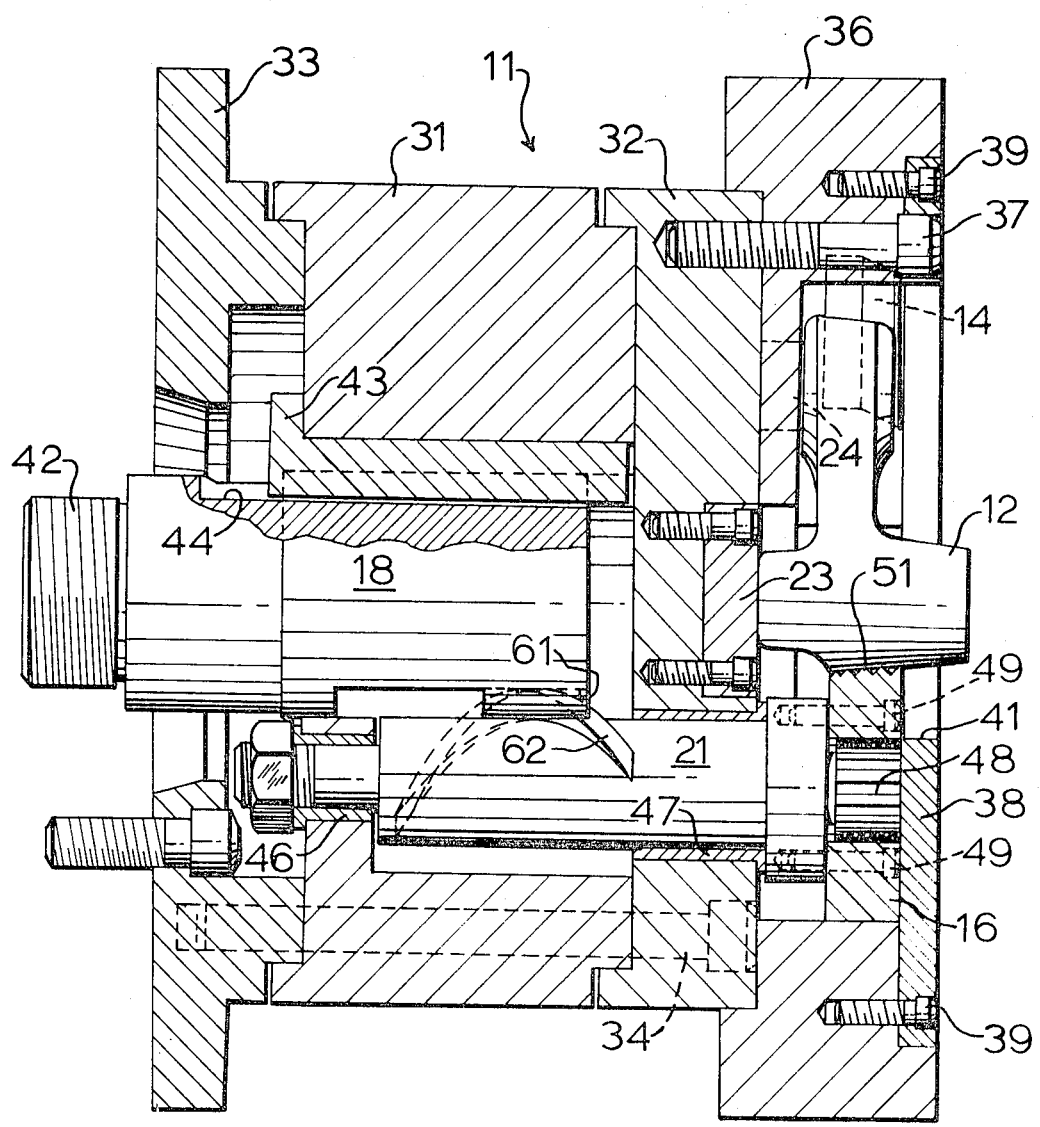

CAM JAW CHUCK

The present invention relates to chuck assemblies and more particularly to a chuck assembly having cam-shaped jaw means which are rotated by longitudinal movement of a drawbar for securing or releasing a workpiece.

The present chuck assembly is particularly contemplated for use on friction welding machines. In such applications, the chuck must firmly and accurately secure the workpiece while it is rotated at high speeds and subjected to substantial axial thrust forces.

In addition to advantage of the type discussed above, a chuck assembly constructed according to the present invention facilitates installation of a workpiece upon the chuck assembly and its removal therefrom. Still further, the chuck assembly is particularly adapted to receive workpieces having a wide variety of sizes and shapes.

Other objects and advantages of the present invention are made apparent in the following description having reference to the accompanying drawings.

In the drawings:

FIG. 1 is an end view of the present chuck assembly with parts shown in section to illustrate internal features of the chuck;

FIG 2 is a view taken along section lines II—II of FIG. 1; and

FIG. 3 is a fragmentary view of an internal portion of the chuck assembly illustrating interconnecting means for rotating the jaws by longitudinal movement of a drawbar.

Referring particularly to FIGS. 1 and 2, a chuck assembly constructed according to the present invention includes a chuck body 11 constructed of various members which are described in greater detail below. The chuck assembly is adapted to secure a workpiece such as that indicated at 12. The workpiece 12 is secured upon the chuck by stop means such as the members indicated at 13 and 14 in conjunction with cam-shaped jaw means such as the two rotatable cam jaws indicated respectively at 16 and 17. The jaws 16 and 17 are rotated by longitudinal movement of drawbar means such as the shaft 18 (see FIG. 2). The drawbar shaft 18 is keyed to support shafts 21 and 22 which rotatably support the respective jaws 16 and 17. The keyed interconnection between the shaft 18 and the respective shafts 21 and 22 may be best seen for example in FIG. 3.

The jaws 16 and 17 may be rotated to firmly secure the workpiece 12 against the stops 13 and 14. Alignment of the workpiece is also maintained by a backup plate 23 and backup blocks 24 and 26 which are secured to the chuck body and axially abut various portions of the workpiece when it is installed upon the chuck assembly. The stops 13, 14, the backup plate 23 and the blocks 24, 26 are replaceably mounted upon the chuck body so that they may be rapidly changed to adapt the chuck assembly for receiving workpieces having a wide variety of sizes and shapes.

The chuck body 11 includes a central housing member 31 and a thrust plate 32 which are secured to a spindle adapter plate 33 by capscrews such as that indicated at 34. A forward adapter plate 36 is fastened to the thrust plate by capscrews such as that indicated at 37 while a cover plate 38 is fastened to the adapter plate by capscrews indicated for example at 39. The cover plate 38 has a cutout 41 which is sized to receive the workpiece 12 while protecting various internal components of the chuck assembly. The cover plate 38 may also be replaced to provide a cutout conforming with workpieces of different size or shape.

Referring particularly to FIG. 2, the drawbar shaft 18 is threaded, as indicated at its leftward end at 42, for coupling with a drawbar or longitudinally operating motor means. The drawbar shaft 18 is slidably arranged within the central housing member 31 and is secured against rotation by a key 43 which rides within a slot 44 formed by the shaft 18.

The support shafts 21 and 22 for the cam jaws are rotatably supported within the central housing member 31 and the thrust plate 32 by bushings such as those indicated in FIG. 2 at 46 and 47 for the shaft 21.

Each of the support shafts 21 and 22 includes splines 48 which mate with the respective cam jaws 16 and 17 so that the cam jaws are rotatably carried by the two shafts. The cam jaws are retained upon the shaft by a plurality of cap screws such as those indicated at 49.

The cam jaws 14 and 16 include serrations 51 about their outer peripheral surfaces to provide for increased gripping relations with the workpiece 12. The peripheral surfaces of the cam jaws also include notches indicated respectively at 52 and 53 which may be brought into alignment with the workpiece 12 to facilitate its installation upon the chuck assembly or its removal therefrom.

The means for interconnecting the drawbar shaft 18 and the support shaft 21 and 22 may be best seen with particular reference to FIG. 3 as well as to FIGS. 1 and 2.

Longitudinal or axial motion of the drawbar shaft 18 is translated into rotation of the support shaft 21, 22 and cam jaws 16, 17 by angled slots 61 formed in the drawbar shaft 18 and meshing keys 62 and 63 which are formed respectively upon the two support shafts 21 and 22. The keys 62 and 63 are extended along a generally helical path so that the cam jaws continue to be rotated during longitudinal movement of the drawbar shaft 18. The slots 61 and the keys 62, 63 are arranged in opposing angular relationship so that the cam jaws 16 and 17 are rotated in opposite directions as the drawbar shaft 18 is moved axially in either direction.

In operation, the drawbar shaft 18 is shifted to its rearward or leftward position as viewed in FIG. 2 so that the jaws 16 and 17 are rotated into a position with their cutouts 52, 53 arranged to receive the workpiece 12. The workpiece 12 is then inserted in abutting relation with the backup plate 23 between the stops 13, 14 and the jaws 16, 17. The drawbar shaft 18 is then shifted in a forward or rightward direction as viewed in FIG. 2 causing the cam jaw 16 to rotate in a clockwise direction and the cam jaw 17 to rotate in a counterclockwise direction. Because of the cam shape of the jaws, their serrated surfaces engage the workpiece and urge it upwardly against the stops 13 and 14. In this manner, the workpiece may be firmly wedged in place between the stops and the cam jaws. The workpiece is maintained in this position until it is to be removed from the chuck. At that time, the drawbar shaft 18 is again shifted in a leftward direction with the jaws 16, 17 rotating in opposite directions to release the workpiece. When the cutouts 52, 53 are again in alignment with the workpiece, the workpiece may be readily removed from the chuck assembly and a new workpiece inserted in its place.

We claim:

1. A chuck assembly for securing a workpiece, comprising
   a chuck body for receiving the workpiece,
   a pair of cam shaped jaws arranged on the chuck body, said jaws being respectively secured to support shafts rotatably mounted in the chuck body, said two jaws having oppositely arranged cam surfaces for engagement with the workpiece, said support shafts also being adapted for simultaneous rotation in opposite directions by longitudinal movement of said drawbar shaft,
   stop means arranged on the chuck body for supporting the workpiece in conjunction with said jaw means, and
   a drawbar shaft slidably supported along a central axis of said chuck body, said drawbar shaft being effectively keyed to said support shafts for causing them to rotate in response to longitudinal movement of said drawbar shaft.

2. The invention of claim 1 wherein said stop means is replaceably secured to the chuck body, backup means also being replaceably secured to the chuck body for axially abutting the workpiece, said replaceable stop means and backup means permitting a variety of workpieces to be secured in place of said jaws.

3. The invention of claim 1 wherein said drawbar shaft is effectively coupled to each of said support shafts by a key and notch, at least one of the key and notch being extended along a generally helical path for rotation of said support shafts by longitudinal movement of said drawbar shaft.

4. The invention of claim 1 wherein said stop means comprises two members circumferentially spaced apart relative to each other and said cam jaws on said chuck body, said jaws having serrated, cam shaped, peripheral surfaces for engaging the workpiece, said peripheral surfaces also including axially arranged notches to facilitate installation or removal of the workpiece upon the chuck assembly.

5. A chuck assembly for securing a workpiece, comprising
   a chuck body,
   cam shaped jaw means rotatably mounted on the chuck body for engaging the workpiece, said jaw means comprising a plurality of cam shaped jaws respectively secured to a plurality of respective shafts, the shafts being rotatably mounted on the chuck body, said stop means being replaceably secured to the chuck body,
   stop means arranged on the chuck body for supporting the workpiece in conjunction with said jaw means,
   drawbar means, and
   means interconnecting the drawbar means and jaw means for rotating said jaw means and causing them to secure or release the workpiece in response to movement of the drawbar means, said interconnecting means comprising another shaft secured against rotation relative to said chuck body and axially movable relative thereto, said other shaft begin effectively keyed to said plurality of shafts to provide for rotation of said plurality of shafts in response to longitudinal shifting of said other shaft by said drawbar means.

* * * * *

UNITED STATES PATENT OFFICE
CERTIFICATE OF CORRECTION

Patent No. 3,618,961    Dated November 9, 1971

Inventor(s) Jozef Kiwalle and Frederick M. Lamb

It is certified that error appears in the above-identified patent and that said Letters Patent are hereby corrected as shown below:

Column 2, line 70, "of" should be --by--.

Signed and sealed this 18th day of April 1972.

(SEAL)
Attest:

EDWARD M. FLETCHER, JR.          ROBERT GOTTSCHALK
Attesting Officer                 Commissioner of Patents